United States Patent
Shoji et al.

(10) Patent No.: US 10,606,252 B2
(45) Date of Patent: Mar. 31, 2020

(54) CONTROL DEVICE INCLUDING ONE MICROCOMPUTER FOR CONTROLLING A MOTOR VEHICLE WHICH MAY IMMEDIATELY STOP ROTATIONS OF THE MOTOR WHEN AN ABNORMAL CONDITION OCCURS

(71) Applicant: SHINDENGEN ELECTRIC MANUFACTURING CO., LTD., Chiyoda-ku (JP)

(72) Inventors: Takuya Shoji, Hanno (JP); Tomohiro Tanabe, Hanno (JP)

(73) Assignee: SHINDENGEN ELECTRIC MANUFACTURING CO., LTD., Chiyoda-ku (JP)

( * ) Notice: Subject to any disclaimer, the term of this patent is extended or adjusted under 35 U.S.C. 154(b) by 120 days.

(21) Appl. No.: 15/765,060

(22) PCT Filed: Oct. 31, 2016

(86) PCT No.: PCT/JP2016/082312
§ 371 (c)(1),
(2) Date: Mar. 30, 2018

(87) PCT Pub. No.: WO2018/078870
PCT Pub. Date: May 3, 2018

(65) Prior Publication Data
US 2019/0049940 A1    Feb. 14, 2019

(51) Int. Cl.
*G05B 9/02*    (2006.01)
*G05B 23/02*    (2006.01)
(Continued)

(52) U.S. Cl.
CPC ....... *G05B 23/0237* (2013.01); *B62D 5/0493* (2013.01); *G05B 19/0428* (2013.01); *G05B 23/0286* (2013.01); *G06F 11/1441* (2013.01)

(58) Field of Classification Search
CPC ....................................................... G05B 9/02
(Continued)

(56) References Cited

U.S. PATENT DOCUMENTS

| | | | | |
|---|---|---|---|---|
| 5,561,277 A * | 10/1996 | Bockhold | ............... | B66B 1/285 |
| | | | | 187/247 |
| 6,498,403 B1 * | 12/2002 | Hagidaira | ............ | B62D 5/0484 |
| | | | | 307/10.1 |
| 6,799,110 B2 * | 9/2004 | Hashimoto | ........... | F02D 11/107 |
| | | | | 123/198 D |

(Continued)

FOREIGN PATENT DOCUMENTS

| | | |
|---|---|---|
| JP | 8-163883 A | 6/1996 |
| JP | 2000-142363 A | 5/2000 |

(Continued)

OTHER PUBLICATIONS

International Search Report dated Dec. 6, 2016 in PCT/JP2016/082312 filed Oct. 31, 2016 (with Translation of Category of Cited Documents in attached foreign language Search Report).

*Primary Examiner* — Suresh Suryawanshi
(74) *Attorney, Agent, or Firm* — Oblon, McClelland, Maier & Neustadt, L.L.P.

(57) ABSTRACT

A control system includes a system power supply IC that operates based on a voltage outputted from a power supply circuit and supplies a voltage for operating a microcomputer to the microcomputer, monitors an abnormal condition of the microcomputer, and outputs a reset signal for resetting the microcomputer to the microcomputer when detecting an abnormal condition of the microcomputer. When detecting the abnormal condition of the microcomputer, the system power supply IC outputs a switch opening signal for forcibly turning off a switch, which, in response to the switch opening signal, stops supplying the voltage outputted from the power supply circuit to the motor driving circuit.

11 Claims, 3 Drawing Sheets

(51) Int. Cl.
*B62D 5/04* (2006.01)
*G06F 11/14* (2006.01)
*G05B 19/042* (2006.01)

(58) Field of Classification Search
USPC .......................................................... 700/79
See application file for complete search history.

(56) References Cited

U.S. PATENT DOCUMENTS

| | | | | |
|---|---|---|---|---|
| 7,269,492 | B2* | 9/2007 | Tanabe | G06F 11/0736 |
| | | | | 701/51 |
| 7,610,119 | B2* | 10/2009 | Abe | G05B 9/03 |
| | | | | 307/113 |
| 8,803,456 | B2* | 8/2014 | Zushi | H02H 7/122 |
| | | | | 318/400.22 |
| 9,547,305 | B2* | 1/2017 | Ushiyama | G05B 19/4062 |
| 9,676,368 | B2* | 6/2017 | Guo | B60R 25/00 |
| 9,740,178 | B2* | 8/2017 | Debouk | G05B 9/03 |
| 2003/0128485 | A1* | 7/2003 | Matsumoto | H02H 3/06 |
| | | | | 361/18 |
| 2003/0144778 | A1* | 7/2003 | Miyano | F02D 41/22 |
| | | | | 701/34.3 |
| 2003/0221668 | A1* | 12/2003 | Hashimoto | F02D 11/105 |
| | | | | 123/396 |
| 2008/0054716 | A1* | 3/2008 | Sato | B60T 1/10 |
| | | | | 303/16 |
| 2008/0183361 | A1* | 7/2008 | Oyama | B60L 3/003 |
| | | | | 701/99 |
| 2008/0312790 | A1* | 12/2008 | Fey | B60R 21/0132 |
| | | | | 701/38 |
| 2010/0004811 | A1* | 1/2010 | Kannan | G07C 5/085 |
| | | | | 701/36 |
| 2012/0062158 | A1* | 3/2012 | Itou | H02P 23/0077 |
| | | | | 318/400.21 |
| 2013/0307435 | A1* | 11/2013 | Takagimoto | G05F 1/468 |
| | | | | 315/224 |
| 2017/0093149 | A1* | 3/2017 | Liu | H02H 7/09 |
| 2017/0131698 | A1* | 5/2017 | Hatakeyama | G06F 11/30 |
| 2019/0210612 | A1* | 7/2019 | VanLandingham | B60W 10/06 |

FOREIGN PATENT DOCUMENTS

| | | |
|---|---|---|
| JP | 2005-37034 A | 2/2005 |
| JP | 2008-37321 A | 2/2008 |
| JP | 2012-107522 A | 6/2012 |
| JP | 2012-168605 A | 9/2012 |

* cited by examiner

CONTROL DEVICE INCLUDING ONE MICROCOMPUTER FOR CONTROLLING A MOTOR VEHICLE WHICH MAY IMMEDIATELY STOP ROTATIONS OF THE MOTOR WHEN AN ABNORMAL CONDITION OCCURS

TECHNICAL FIELD

The present invention relates to a control device and a method of controlling a control device.

BACKGROUND ART

Conventionally known control devices include those with two CPUs, namely a main microcomputer and a sub microcomputer (for example, see Patent Document 1).

Figure 3:
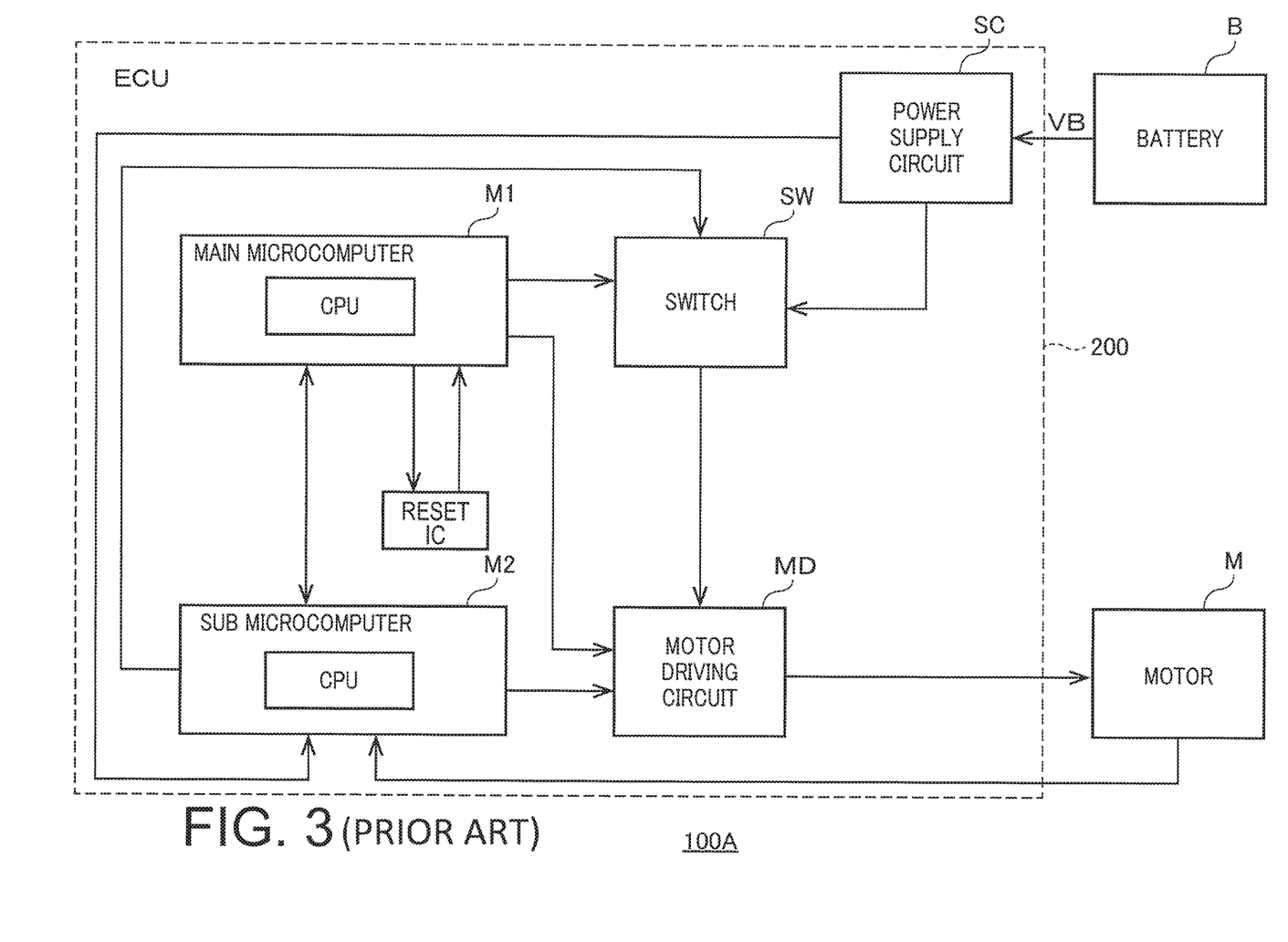
FIG. 3 is a diagram illustrating an example of a conventional driving system 100A.

For example, a conventional control device 100A includes a power supply circuit SC configured to output a voltage based on a battery voltage VB outputted from a battery B, a motor driving circuit MD configured to drive a motor M with the voltage outputted from the power supply circuit SC, a switch SW configured to switch the supply to the motor driving circuit MD of the voltage outputted from the power supply circuit SC, a main microcomputer M1 configured to control the switch SW and the motor driving circuit MD, a sub microcomputer M2, and a reset IC configured to control the main microcomputer M1 (FIG. 3).

The main microcomputer M1 and the sub microcomputer M2 included in the conventional control device 100A monitor each other to detect an abnormal condition (out-of-control state).

If the main microcomputer M1 of the conventional control device 100A becomes out of control and abnormally controls the motor M that is the target of the control, the sub microcomputer M2, which monitors the feedback of the operation of the motor M, controls the motor driving circuit MD to stop the motor M based on the monitoring result.

This may cause a problem in that a large time lag is generated between the time when the abnormal condition occurs to the main microcomputer M1 and the time when the motor M stops.

Furthermore, the two-CPU configuration including the main microcomputer M1 and the sub microcomputer M2 of the conventional control device 100A increases the substrate size, and in turn increases the manufacturing costs.

PRIOR ART DOCUMENT

Patent Document

[Patent Document 1] JP2012-107522 A

SUMMARY OF THE INVENTION

Problem to be Solved by the Invention

Under such circumstances, an object of the present invention is to provide a control device which includes only one microcomputer for controlling a motor in order to reduce the manufacturing costs, and which may immediately stop rotations of the motor that is the target of control, when an abnormal condition occurs to the microcomputer.

Solution to Problem

A control device according to an embodiment in an aspect of the present invention includes:

a power supply circuit configured to output a voltage based on a battery voltage outputted from a battery;

a motor driving circuit configured to drive a motor by the voltage outputted from the power supply circuit;

a switch connected between the power supply circuit and the motor driving circuit, turned on to supply the voltage outputted from the power supply circuit to the motor driving circuit, and turned off to stop supplying the voltage outputted from the power supply circuit to the motor driving circuit;

a microcomputer including a first processing unit that outputs a motor control signal for driving the motor to the motor driving circuit and a switch control signal for turning on or off the switch, and a second processing unit that carries out a mathematical operation corresponding to a mathematical operation carried out by the first processing unit, the microcomputer being configured to output an error signal based on an operation result of the first processing unit and an operation result of the second processing unit; and a system power supply IC configured to operate based on the voltage outputted from the power supply circuit, supply to the microcomputer the voltage for operating the microcomputer, monitor whether an abnormal condition occurs to the microcomputer, and output a reset signal for resetting the microcomputer to the microcomputer when detecting the abnormal condition of the microcomputer, wherein the system power supply IC outputs a switch opening signal for forcibly turning off the switch regardless of whether the switch control signal is outputted from the microcomputer when detecting the abnormal condition of the microcomputer, and the switch stops supplying the voltage outputted from the power supply circuit to the motor driving circuit based on the switch opening signal.

In the control device, the system power supply IC outputs a motor brake signal for applying a brake on the motor when detecting the abnormal condition of the microcomputer, and the motor driving circuit applies a brake on the motor in response to the motor brake signal.

In the control device, the system power supply IC detects the abnormal condition of the microcomputer by at least one of a termination of output of a watchdog pulse signal from the microcomputer, an output of a response that has a value different from an expected value from the microcomputer during a communication with the microcomputer, and an output of the error signal from the microcomputer.

In the control device, the system power supply IC outputs the reset signal to the microcomputer and outputs the switch opening signal when detecting the abnormal condition of the microcomputer.

In the control device, the system power supply IC outputs the reset signal to the microcomputer and outputs the motor brake signal when detecting the abnormal condition of the microcomputer.

In the control device, the microcomputer restarts in response to the reset signal, after the restart, the microcomputer reads, from the system power supply IC 20 through a communication, an error status relating to the abnormal condition of the microcomputer detected by the system power supply IC, the microcomputer determines which abnormal condition occurs based on the error status that is read, and the microcomputer performs a latch-stop operation when the abnormal condition that is determined relates to an inside of the control device.

In the control device, the microcomputer stops outputting the motor control signal to stop driving the motor by means of the motor driving circuit and turns off the switch with the switch control signal when the abnormal condition that is determined is the termination of output of the watchdog pulse signal from the microcomputer, the output of the response that has the value different from the expected value from the microcomputer during the communication with the system power supply IC, or the output of the error signal from the microcomputer.

In the control device, the first processing unit and the second processing unit of the microcomputer are integrated on one semiconductor chip.

In the control device, the control device is mounted on a vehicle, and the motor is used to adjust a steering angle of a wheel of the vehicle.

In the control device, the system power supply IC outputs warning information to outside when detecting the abnormal condition of the microcomputer.

In the control device, the system power supply IC includes a memory unit for storing the error status relating to the abnormal condition of the microcomputer detected by the system power supply IC.

In the control device, the motor driving circuit includes a full-bridge circuit configured to supply, to the motor, a motor current generated from the voltage outputted from the power supply circuit, and with the motor brake signal, the system power supply IC turns off all of arms on a high side and turns on all of arms on a low side of the full-bridge circuit to apply a short-circuit brake on the motor.

In the control device, the microcomputer does not perform the latch-stop operation when the abnormal condition that is determined is an externally caused abnormal communication.

In the control device, the monitor CPU, which is the second processing unit, carries out a mathematical operation that is identical with a mathematical operation carried out by the control CPU, which is the first processing unit; and the microcomputer outputs the error signal if an operation result of the control CPU differs from an operation result of the monitor CPU for a predetermined process.

A method of controlling a control device according to an embodiment in an aspect of the present invention is a method controlling a device including:

a power supply circuit configured to output a voltage based on a battery voltage outputted from a battery;

a motor driving circuit configured to drive a motor by the voltage outputted from the power supply circuit;

a switch connected between the power supply circuit and the motor driving circuit, turned on to supply the voltage outputted from the power supply circuit to the motor driving circuit, and turned off to stop supplying the voltage outputted from the power supply circuit to the motor driving circuit;

a microcomputer including a first processing unit that outputs a motor control signal for driving the motor to the motor driving circuit and a switch control signal for turning on or off the switch, and a second processing unit that carries out a mathematical operation corresponding to a mathematical operation carried out by the first processing unit, the microcomputer being configured to output an error signal based on an operation result of the first processing unit and an operation result of the second processing unit; and a system power supply IC configured to operate based on the voltage outputted from the power supply circuit, supply to the microcomputer a voltage for driving the microcomputer, monitor whether an abnormal condition occurs to the microcomputer, and output a reset signal for resetting the microcomputer to the microcomputer when detecting the abnormal condition of the microcomputer, the method comprising:

outputting, from the system power supply IC, a switch opening signal for forcibly turning off the switch regardless of whether the switch control signal is outputted from the microcomputer when the system power supply IC detects an abnormal condition of the microcomputer; and based on the switch opening signal, stopping, by means of the switch, supplying the voltage outputted from the power supply circuit to the motor driving circuit.

Effects of the Invention

A control device according to an aspect of the present invention is a control device includes:

a power supply circuit configured to output a voltage based on a battery voltage outputted from a battery;

a motor driving circuit configured to drive a motor by the voltage outputted from the power supply circuit;

a switch connected between the power supply circuit and the motor driving circuit, turned on to supply the voltage outputted from the power supply circuit to the motor driving circuit, and turned off to stop supplying the voltage outputted from the power supply circuit to the motor driving circuit;

a microcomputer including a first processing unit (control CPU) that outputs a motor control signal (motor driving pulse) for driving the motor to the motor driving circuit and a switch control signal for turning on or off the switch, and a second processing unit (monitor CPU) that carries out a mathematical operation corresponding to a mathematical operation carried out by the first processing unit, the microcomputer being configured to output an error signal based on (if there is a difference between) an operation result of the first processing unit and an operation result of the second processing unit; and a system power supply IC configured to operate based on the voltage outputted from the power supply circuit, supply to the microcomputer the voltage for operating the microcomputer, monitor whether an abnormal condition occurs to the microcomputer, and output a reset signal for resetting the microcomputer to the microcomputer when detecting the abnormal condition of the microcomputer.

The system power supply IC outputs a switch opening signal for forcibly turning off the switch when detecting the abnormal condition of the microcomputer, and the switch stops supplying the voltage outputted from the power supply circuit to the motor driving circuit in response to the switch opening signal.

Thus, the control device according to the present invention includes only one microcomputer for controlling the motor in order to reduce the manufacturing costs, and monitors whether an abnormal condition occurs to the microcomputer by means of the system power supply IC. If an abnormal condition occurs to the microcomputer, the control devices may stop the supply of the voltage to the motor driving circuit to immediately stop the operation of the motor, which is the target of control, regardless of whether there is a feedback from the motor.

As a result, the period of time during which the motor, which is the target of control, is abnormally controlled may be considerably reduced as compared to conventional cases.

EMBODIMENTS FOR CARRYING OUT THE INVENTION

Embodiments of the present invention will now be described with reference to the accompanying drawings.

First Embodiment

Figure 1:
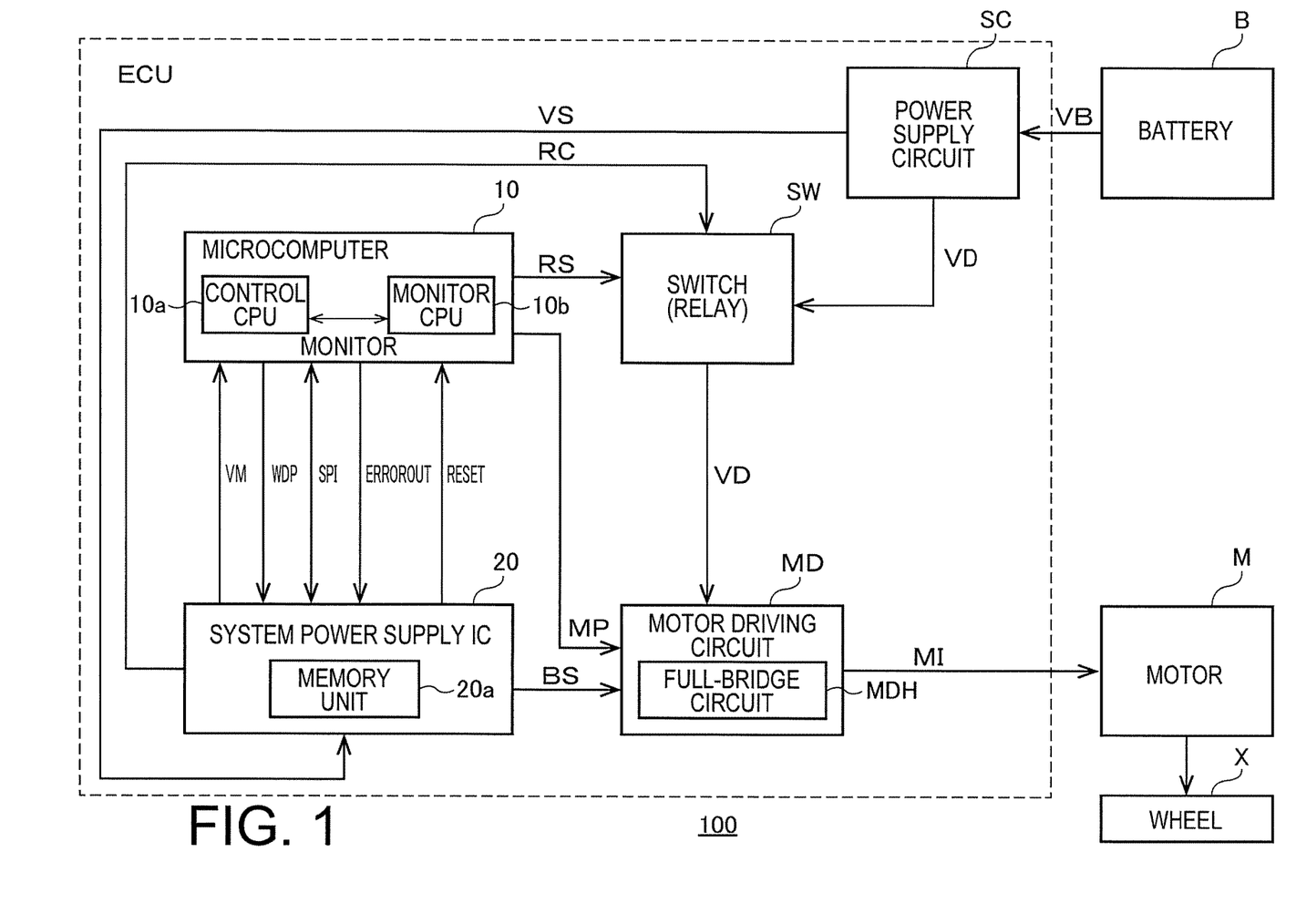
FIG. 1 is a diagram illustrating an example of a driving system 100 according to an embodiment.

FIG. 1 is a diagram illustrating an example of a driving system 100 according to an embodiment.

The driving system 100 according to the embodiment includes a battery B, a motor M, a control device ECU, and a wheel X, as shown in FIG. 1.

The battery B outputs a battery voltage VB, which is a DC voltage.

The driving system 100 is mounted on a vehicle such as a four-wheel vehicle. The wheel X in this case is the wheel of the vehicle. The motor M in this case is connected to a mechanism for adjusting a steering angle of the wheel X of the vehicle by conveying a rotation torque to the mechanism. The motor M is used to adjust the steering angle of the wheel X of the vehicle.

The motor M may drive a mechanism (load) other than the wheel X.

The control device ECU is configured to drive and control the motor M with the battery voltage VB outputted from the battery B. The control device ECU also controls an internal combustion engine (not shown) of the vehicle, for example.

The control device ECU includes, for example, a power supply circuit SC, a motor driving circuit MD, a switch (relay) SW, a microcomputer 10, and a system power supply IC 20, as shown in FIG. 1.

The power supply circuit SC is configured to output power supply voltages VD and VS based on the battery voltage VB outputted from the battery B. The power supply circuit SC steps up or down the battery voltage VB to output the power supply voltage VD or VS.

The switch SW is connected between an output of the power supply circuit SC and an input of the power supply included in the motor driving circuit MD.

The switch SW is turned on to connect the output of the power supply circuit SC and the input of the power supply included in the motor driving circuit MD to supply the voltage VD outputted from the power supply circuit SC to the motor driving circuit MD.

The switch SW is turned off to disconnect the output of the power supply circuit SC and the input of the power supply included in the motor driving circuit MD to stop the supply, to the motor driving circuit MD, of the voltage VD outputted from the power supply circuit SC.

The motor driving circuit MD is configured to operate by the supply of the voltage VD outputted from the power supply circuit SC via the switch SW. The motor driving circuit MD thus operates when supplied with the voltage VD, generates a motor current MI from the voltage VD, and drives the motor M by the motor current MI.

The motor driving circuit MD therefore stops the operation for outputting the motor current MI, and thereby stopping the operation of the motor M when the supply of the voltage VD stops.

The motor driving circuit MD is also configured to apply a brake on the motor M in response to a motor brake signal BS.

The motor driving circuit MD includes a full-bridge circuit MDH as exemplarily shown in FIG. 1.

The full-bridge circuit MDH is configured to supply the motor current MI generated from the voltage VD outputted from the power supply circuit SC (supplied from the power supply circuit SC via the switch SW) to the motor M. The motor M is configured to be driven by the motor current MI. When the motor M is driven, for example, the steering angle of the wheel X of the vehicle is adjusted.

The microcomputer 10 is configured to control the supply of the voltage VD outputted from the power supply circuit SC to the motor driving circuit MD by controlling the switch SW with a switch control signal (relay ON/OFF signal) RS.

The microcomputer 10 is also configured to control the operation of the motor M (such as the rotational speed and the acceleration) by controlling the operation of the motor driving circuit MD (output of the motor current MI) with a motor control signal (motor driving pulse) MP.

The microcomputer 10 includes, for example, a control central processing unit (CPU) 10a, which is a first processing unit, and a monitor CPU 10b, which is a second processing unit, as shown in FIG. 1.

The control CPU 10a is configured to output the motor control signal MP for driving the motor M to the motor driving circuit MD, and the switch control signal RS for turning on or off the switch SW.

The monitor CPU 10b is configured to carry out a mathematical operation corresponding to a mathematical operation carried out by the control CPU 10a. For example, the monitor CPU 10b carries out the same mathematical operation as the control CPU with respect to a predetermined process.

The microcomputer 10 outputs an error signal ERROROUT based on the operation result of the control CPU 10a and the operation result of the monitor CPU 10b for the predetermined process. For example, the microcomputer 10 outputs the error signal ERROROUT when the operation result of the control CPU differs from the operation result of the monitor CPU for the predetermined process.

The control CPU 10a and the monitor CPU 10b (including other elements that are not shown of the microcomputer 10) of the microcomputer 10 are integrated on one semiconductor chip.

The system power supply IC 20 is configured to be operated by the voltage VS outputted from the power supply circuit SC and supply, to the microcomputer 10, the voltage VM for operating the microcomputer 10.

The system power supply IC 20 is also configured to monitor the microcomputer 10 for an abnormal condition, and outputs a reset signal RESET for resetting the microcomputer 10 to the microcomputer 10 when detecting an abnormal condition of the microcomputer 10.

When detecting an abnormal condition of the microcomputer 10, the system power supply IC 20 outputs a switch opening signal RC for forcibly turning off the switch (relay) SW regardless of whether the switch control signal RS is being outputted from the microcomputer 10.

The switch SW stops the supply of the voltage VD outputted from the power supply circuit SC to the motor driving circuit MD based on the switch opening signal RC outputted from the system power supply IC 20 (when receiving the switch opening signal RC).

When detecting an abnormal condition of the microcomputer 10, the system power supply IC 20 also outputs the motor brake signal BS for applying a brake on the motor M.

As described above, the motor driving circuit MD applies a brake on the motor M in response to the motor brake signal BS.

Using the motor brake signal BS, the system power supply IC 20 turns off all of arms on a high side of the full-bridge circuit MDH, and turns on all of arms on a low side to apply a short-circuit brake on the motor M. As a result, the rotation of the motor M is stopped, and the adjustment of the steering angle of the wheel X of the vehicle is stopped. In this case, the adjustment of the steering angle of the wheel X may be stopped after the steering angle of the wheel X is adjusted to be at a predefined position.

The system power supply IC 20 includes, for example, a memory unit 20a as shown in FIG. 1. The memory unit 20a is configured to store information including an error stats relating to the abnormal condition of the microcomputer 10 detected by the system power supply IC 20.

The system power supply IC 20 is configured to detect an abnormal condition occurring to the microcomputer 10 when, for example, the microcomputer 10 stops outputting a watchdog pulse signal WDP.

The system power supply IC 20 is also configured to detect an abnormal condition occurring to the microcomputer 10 when a response (value) outputted from the microcomputer 10 to an inquiry of the system power supply IC 20 in a communication SPI between the system power supply IC 20 and the microcomputer 10 is different from a value expected be outputted from the microcomputer 10.

The system power supply IC 20 is also configured to detect an abnormal condition of the microcomputer 10 when the microcomputer 10 outputs the error signal ERROROUT.

Thus, the system power supply IC 20 detects an abnormal condition of the microcomputer 10 by the termination of the output of the watchdog pulse signal WDP from the microcomputer 10, the output of a response from the microcomputer 10, which has a value that is different from an expected value, in the communication SPI between the system power supply IC 20 and the microcomputer 10, or the output of an error signal ERROROUT from the microcomputer 10.

The system power supply IC 20 is configured to output the reset signal RESET to the microcomputer 10 together with (at the same time, for example), the switch opening signal RC when detecting an abnormal condition of the microcomputer 10.

When an abnormal condition occurs to the microcomputer 10, the supply of the voltage VD outputted from the power supply circuit SC to the motor driving circuit MD may be immediately stopped in this manner. In other words, the time lag form the time when an abnormal condition occurs to the main microcomputer M1 to the time the motor M is stopped may be reduced.

When detecting an abnormal condition of the microcomputer 10, the system power supply IC 20 outputs the reset signal RESET to the microcomputer 10, and (for example, at the same time) outputs the motor brake signal BS.

When an abnormal condition occurs to the microcomputer 10, the motor M may be immediately stopped in this manner. In other words, the time lag between when the abnormal condition occurs to the main microcomputer M1 and when the motor M is stopped may be reduced.

The microcomputer 10 is configured to restart in response to the reset signal RESET.

After the restart, the microcomputer 10 reads, from the system power supply IC 20 (memory unit 20a) over the communication SPI, the error status relating to the abnormal condition of the microcomputer 10 detected by the system power supply IC 20.

Based on the read error status, the microcomputer 10 determines which abnormal condition has occurred.

If the content of the abnormal condition relates to the inside of the control device 100 (such as the operation and the circuits), the microcomputer 10 performs a latch-stop operation (so that the microcomputer 10 itself does not restarted).

If the content of the abnormal condition determined based on the read error status is the termination of the output of the watchdog pulse signal WDP from the microcomputer 10, the microcomputer 10 stops the output of the motor control signal MP to stop the operation of the motor M by the motor driving circuit MD, and turns of the switch SW with the switch control signal RS.

If the content of the abnormal condition determined based on the read error status is the response from the microcomputer 10, which has a value that is different from an expected value, in the communication SPI with the system power supply IC 20, the microcomputer 10 also stops the output of the motor control signal MP to stop the operation of the motor M by the motor driving circuit MD, and turns off the switch SW with the switch control signal RS.

If the content of the abnormal condition determined based on the read error status is the output of the error signal ERROROUT from the microcomputer 10, the microcomputer 10 stops the output of the motor control signal MP to stop the operation of the motor M by the motor driving circuit MD, and turns off the switch SW with the switch control signal RS.

In performing the latch-stop operation, the microcomputer 10 thus stops the output of the motor control signal MP to stop the operation of the motor M by the motor driving circuit MD and turns off the switch SW with the switch control signal RS when the output of the watchdog pulse signal WDP from the microcomputer 10 is stopped, the response that is has a value different from an expected value is outputted from the microcomputer 10 in the communication SPI with the system power supply IC 20, or the error signal ERROROUT is outputted from the microcomputer 10.

Thus, when performing the latch-stop operation, the microcomputer 10 may stop the output of the motor control signal MP to stop the operation of the motor M by the motor driving circuit MD, and stop the supply of the voltage VD to the motor driving circuit MD in order to stop the operation of the motor M (not to operate the motor M) more reliably.

The system power supply IC 20 may be configured to output a warning information to the outside (for example, a display unit such as an indicator of the vehicle) when detecting an abnormal condition of the microcomputer 10.

The abnormal operation of the microcomputer 10 or the termination of the motor M may be notified to a user in the vehicle, who sees the display unit in this manner.

The microcomputer 10 restarts in response to the reset signal RESET (step S7), and after that, does not perform the latch-stop operation (performs a predetermined operation (such as the control of the switch SW and the motor driving circuit MD)) if the content of the abnormal operation determined based on the read error status is an externally caused abnormal communication.

Figure 2:
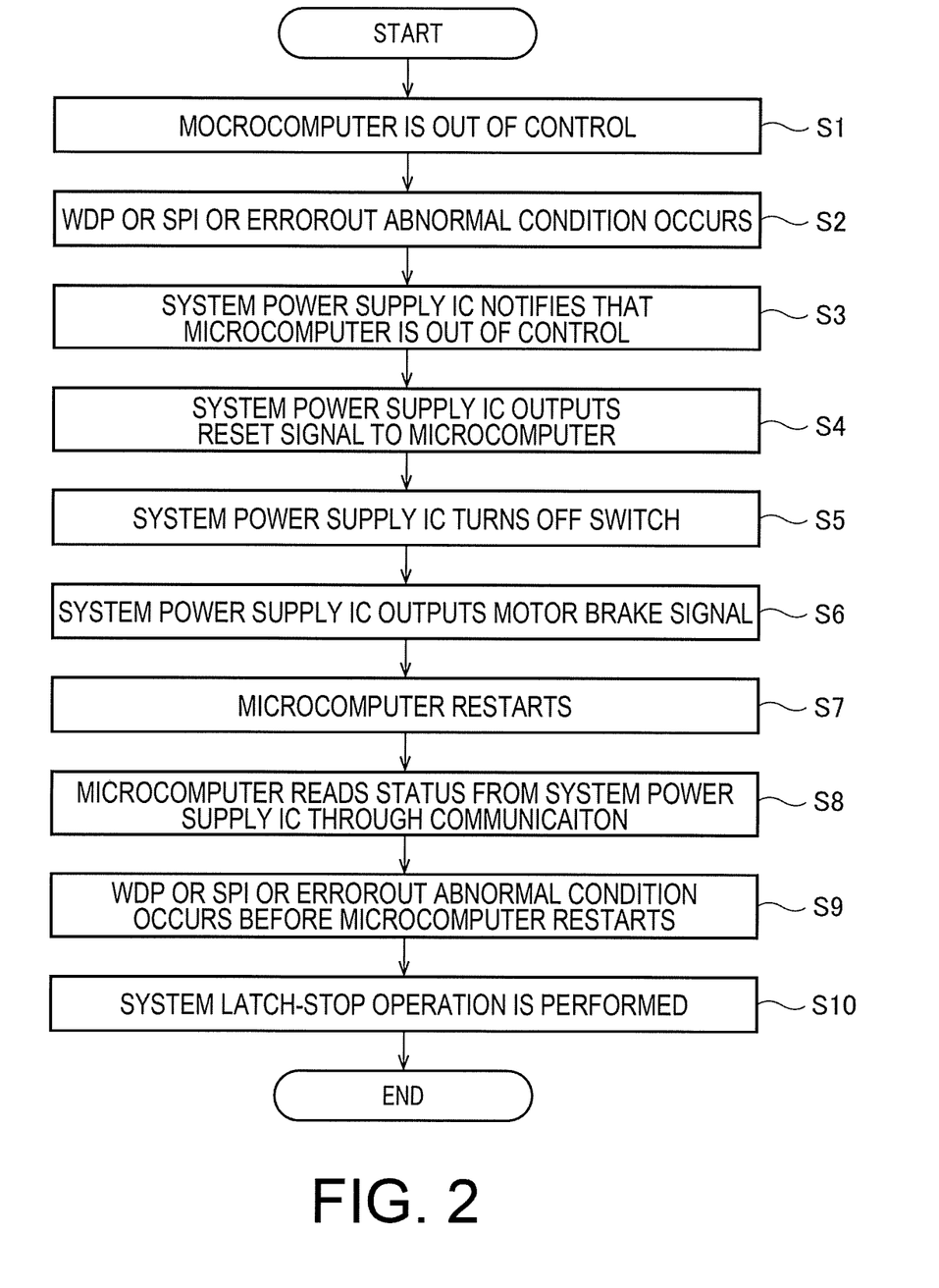
FIG. 2 is a diagram illustrating an example of a flow of a method of controlling a control device ECU included in a driving system 100 shown in FIG. 1.

An example of a flow of a method of controlling the control device ECU of the driving system 100 having the above-described configuration will now be described below. FIG. 2 is a diagram illustrating an example of a flow of a method of controlling the control device ECU of the driving system 100 shown in FIG. 1.

For example, as shown in FIG. 2, the microcomputer 10 becomes out of control during an operation (step S1).

This causes an abnormal operation of the microcomputer 10 such as the termination of the output of the watchdog pulse signal WDP from the microcomputer 10, the output of a response having a value that is different from an expected value from the microcomputer 10 during the communication SPI between the system power supply IC 20 and the microcomputer 10, or the output of the error signal ERROROUT from the microcomputer 10 (step S2).

Monitoring the microcomputer 10, the system power supply IC 20 detects the abnormal condition of the microcomputer 10 (step S3).

As described above, the system power supply IC 20 detects the abnormal condition of the microcomputer 10 by any of the termination of the output of the watchdog pulse signal WDP from the microcomputer 10, the output of a response from the microcomputer 10, which has a value that is different from an expected value, in the communication SPI between the system power supply IC 20 and the microcomputer 10, or the output of the error signal ERROROUT from the microcomputer 10.

The system power supply IC 20 then outputs to the microcomputer 10 the reset signal RESET for resetting the microcomputer 10 (step S4).

When detecting the abnormal condition of the microcomputer 10, the system power supply IC 20 outputs the switch opening signal RC for forcibly turning off the switch (relay) SW regardless of whether the switch control signal RS is outputted from the microcomputer 10 (step S5).

As described above, the switch SW then stops the supply of the voltage VD outputted from the power supply circuit SC to the motor driving circuit MD based on the switch opening signal RC outputted from the system power supply IC 20 (when receiving the switch opening signal RC).

Therefore, when the abnormal condition occurs to the microcomputer 10, the supply of the voltage VD outputted from the power supply circuit SC to the motor driving circuit MD may be immediately stopped. In other words, the time lag between when the abnormal condition occurs to the main microcomputer M1 and when the motor M is stopped may be reduced.

Furthermore, when detecting an abnormal condition of the microcomputer 10, the system power supply IC 20 outputs the motor brake signal BS for applying a brake on the motor M (step S6).

The motor driving circuit MD then applies a brake on the motor M in response to the motor brake signal BS, as described above.

The motor M thus may be immediately stopped when the abnormal condition occurs to the microcomputer 10. In other words, the time lag between when the abnormal condition occurs to the main microcomputer M1 and when the motor M is stopped may be reduced.

As described above, the memory unit 20a of the system power supply IC 20 stores the error status relating to the abnormal condition of the microcomputer 10 detected by the system power supply IC 20.

The microcomputer 10 restarts in response to the reset signal RESET (step S7).

After the restart in step S7, the microcomputer 10 reads, from the system power supply IC 20 (memory unit 20a) through the communication SPI, the error status relating to the abnormal condition of the microcomputer 10 detected by the system power supply IC 20 (step S8).

The microcomputer 10 then determines which abnormal condition has occurred based on the read error status (step S9).

If the content of the determined abnormal condition relates to the inside of the control device 100 (such as the operation and the circuit), the microcomputer 10 performs a latch-stop operation (so as not to restart the microcomputer 10 itself) (step S10).

As described above, when the latch-stop operation is performed, if the content of the abnormal condition determined based on the read error status is the termination of the output of the watchdog pulse signal WDP from the microcomputer 10, the output of a response from the microcomputer 10, which has a value that is different from an expected value, in the communication SPI with the system power supply IC 20, or the output of the error signal ERROROUT from the microcomputer 10, the microcomputer 10 stops outputting the motor control signal MP to stop the operation of the motor M by means of the motor driving circuit MD, and turns of the switch SW with the switch control signal RS.

Thus, when performing a latch-stop operation, the microcomputer 10 may stop outputting the motor control signal MP to stop the motor M by means of the motor driving circuit MD, and stop supplying the voltage VD to the motor driving circuit MD to stop the operation of the motor M (not to drive the motor M) more reliably.

When the system power supply IC 20 detects an abnormal condition of the microcomputer 10, the system power supply IC 20 may output warning information to the outside (for example, a display unit such as an indicator of the vehicle).

Thus, the abnormal condition of the microcomputer 10 or the termination of the rotation of the motor M may be notified to a user in the vehicle, who sees the display unit.

The microcomputer 10 restarts in response to the reset signal RESET (step S7), and after that, does not perform the latch-stop operation (performs a predetermined operation (such as the control of the switch SW and the motor driving circuit MD)) if the content of the abnormal condition determined based on the read error status is an externally caused abnormal communication.

Through the above-described steps, although there is only one microcomputer 10 for controlling the motor to reduce the manufacturing costs, the occurrence of an abnormal condition to the microcomputer 10 is monitored by the system power supply IC 20. If an abnormal condition occurs to the microcomputer 10, the supply of the voltage to the motor driving circuit MD may be stopped to immediately stop the operation of the motor, which is the target of control, regardless of whether there is a feedback from the motor.

The period of time during which the motor, which is the target of control, is abnormally controlled may be considerably reduced in this manner as compared to conventional cases.

As described above, a control device according to an aspect of the present invention includes:

a power supply circuit SC configured to output voltages VD, VS based on a battery voltage VB outputted from a battery;

a motor driving circuit MD configured to drive a motor by the voltage VD outputted from the power supply circuit SC;

a switch (relay) SW connected between the power supply circuit SC and the motor driving circuit MD, turned on to supply the voltage outputted from the power supply circuit SC to the motor driving circuit MD, and turned off to stop supplying the voltage outputted from the power supply circuit SC to the motor driving circuit MD;

a microcomputer 10 including a first processing unit (control CPU) that outputs a motor control signal (relay ON/OFF signal) for driving the motor to the motor driving circuit and a switch control signal (motor driving pulse) for turning on or off the switch, and a second processing unit (monitor CPU) that carries out a mathematical operation corresponding to a mathematical operation carried out by the first processing unit, the microcomputer being configured to output an error signal based on an operation result of the first processing unit and an operation result of the second processing unit; and a system power supply IC 20 configured to operate based on the voltage outputted from the power supply circuit SC, supply to the microcomputer 10 the voltage for operating the microcomputer 10, monitor whether an abnormal condition occurs to the microcomputer 10, and output a reset signal RESET for resetting the microcomputer 10 to the microcomputer 10 when detecting the abnormal condition of the microcomputer 10.

The system power supply IC 20 outputs a switch opening signal RC for forcibly turning off the switch SW when detecting the abnormal condition of the microcomputer 10, and the switch SW stops supplying the voltage outputted from the power supply circuit SC to the motor driving circuit MD in response to the switch opening signal RC.

Thus, the control device according to the present invention includes only one microcomputer 10 for controlling the motor in order to reduce the manufacturing costs, and monitors whether an abnormal condition occurs to the microcomputer 10 by means of the system power supply IC 20. If an abnormal condition occurs to the microcomputer 10, the control devices may stop the supply of the voltage to the motor driving circuit MD to immediately stop the operation of the motor, which is the target of control, regardless of whether there is a feedback from the motor.

As a result, the period of time during which the motor, which is the target of control, is abnormally controlled may be considerably reduced as compared to conventional cases.

Although an example of the configuration of the control device ECU has been described by referring to FIG. 1, the control device ECU may include elements that are not included in the control device ECU shown in FIG. 1 (for example, the battery B and the motor M in FIG. 1) or other circuits or elements that are not shown in FIG. 1.

While certain embodiments have been described, these embodiments have been presented by way of example only, and are not intended to limit the scope of the inventions. The embodiments may be embodied in a variety of other forms. Furthermore, various omissions, substitutions and changes in the form of the methods and systems described herein may be made without departing from the spirit of the inventions. The embodiments and their modifications are included in the scope and the subject matter of the invention, and at the same time included in the scope of the claimed inventions and their equivalents.

EXPLANATION OF REFERENCES

100: driving system
B: battery
M: motor
ECU: control device
X: wheel
SC: power supply circuit
MD: motor driving circuit
SW: switch
10: microcomputer
20: system power supply IC

The invention claimed is:

1. A control device comprising:
a power supply circuit configured to output a voltage based on a battery voltage outputted from a battery;
a motor driving circuit configured to drive a motor by the voltage outputted from the power supply circuit;
a switch connected between the power supply circuit and the motor driving circuit, turned on to supply the voltage outputted from the power supply circuit to the motor driving circuit, and turned off to stop supplying the voltage outputted from the power supply circuit to the motor driving circuit;
a microcomputer including a first processing unit that outputs a motor control signal for driving the motor to the motor driving circuit and a switch control signal for turning on or off the switch, and a second processing unit that carries out a mathematical operation corresponding to a mathematical operation carried out by the first processing unit, the microcomputer being configured to output an error signal based on an operation result of the first processing unit and an operation result of the second processing unit; and
a system power supply IC configured to operate based on the voltage outputted from the power supply circuit, supply to the microcomputer the voltage for operating the microcomputer, monitor whether an abnormal condition occurs to the microcomputer, and output a reset signal for resetting the microcomputer to the microcomputer when detecting the abnormal condition of the microcomputer,
wherein:
the system power supply IC outputs a switch opening signal for forcibly turning off the switch regardless of whether the switch control signal is outputted from the microcomputer when detecting the abnormal condition of the microcomputer, and
the switch stops supplying the voltage outputted from the power supply circuit to the motor driving circuit based on the switch opening signal,
wherein:
the system power supply IC outputs a motor brake signal for applying a brake on the motor when detecting the abnormal condition of the microcomputer, and
the motor driving circuit applies a brake on the motor in response to the motor brake signal,
wherein the system power supply IC detects the abnormal condition of the microcomputer by at least one of a termination of output of a watchdog pulse signal from the microcomputer, an output of a response that has a value different from an expected value from the microcomputer during a communication with the microcomputer, and an output of the error signal from the microcomputer, wherein:
the microcomputer restarts in response to the reset signal,
after the restart, the microcomputer reads, from the system power supply IC through a communication, an error status relating to the abnormal condition of the microcomputer detected by the system power supply IC,
the microcomputer determines which abnormal condition occurs based on the error status that is read, and
the microcomputer performs a latch-stop operation when the abnormal condition that is determined relates to an inside of the control device, and wherein the system power supply IC outputs the reset signal to the microcomputer, and outputs the switch opening signal when detecting the abnormal condition of the microcomputer.

2. The control device according to claim 1, wherein the system power supply IC outputs the reset signal to the microcomputer and outputs the motor brake signal when detecting the abnormal condition of the microcomputer.

3. The control device according to claim 1, wherein the microcomputer stops outputting the motor control signal to stop driving the motor by means of the motor driving circuit and turns off the switch with the switch control signal when the abnormal condition that is determined is the termination of output of the watchdog pulse signal from the microcomputer, the output of the response that has the value different from the expected value from the microcomputer during the communication with the system power supply IC, or the output of the error signal from the microcomputer.

4. The control device according to claim 1, wherein the first processing unit and the second processing unit of the microcomputer are integrated on one semiconductor chip.

5. The control device according to claim 1, wherein the control device is mounted on a vehicle, and the motor driving circuit is used to adjust a steering angle of a wheel of the vehicle.

6. The control device according to claim 1, wherein the system power supply IC outputs warning information to outside when detecting the abnormal condition of the microcomputer.

7. The control device according to claim 1, wherein the system power supply IC includes a memory unit for storing the error status relating to the abnormal condition of the microcomputer detected by the system power supply IC.

8. The control device according to claim 1, wherein:
the motor driving circuit includes a full-bridge circuit configured to supply, to the motor, a motor current generated from the voltage outputted from the power supply circuit; and
with the motor brake signal, the system power supply IC turns off all of arms on a high side and turns on all of arms on a low side of the full-bridge circuit to apply a short-circuit brake on the motor.

9. The control device according to claim 3, wherein the microcomputer does not perform the latch-stop operation when the abnormal condition that is determined is an externally caused abnormal communication.

10. The control device according to claim 1, wherein:
a monitor CPU, which is the second processing unit, carries out a mathematical operation that is identical with a mathematical operation carried out by a control CPU, which is the first processing unit; and
the microcomputer outputs the error signal if an operation result of the control CPU differs from an operation result of the monitor CPU for a predetermined process.

11. A method of controlling a control device, the device including:
a power supply circuit configured to output a voltage based on a battery voltage outputted from a battery;
a motor driving circuit configured to drive a motor by the voltage outputted from the power supply circuit;
a switch connected between the power supply circuit and the motor driving circuit, turned on to supply the voltage outputted from the power supply circuit to the motor driving circuit, and turned off to stop supplying the voltage outputted from the power supply circuit to the motor driving circuit;
a microcomputer including a first processing unit that outputs a motor control signal for driving the motor to the motor driving circuit and a switch control signal for turning on or off the switch, and a second processing unit that carries out a mathematical operation corresponding to a mathematical operation carried out by the first processing unit, the microcomputer being configured to output an error signal based on an operation result of the first processing unit and an operation result of the second processing unit; and
a system power supply configured to operate based on the voltage outputted from the power supply circuit, supply to the microcomputer a voltage for driving the microcomputer, monitor whether an abnormal condition occurs to the microcomputer, and output a reset signal for resetting the microcomputer to the microcomputer when detecting the abnormal condition of the microcomputer, the method comprising:
outputting, from the system power supply IC, a switch opening signal for forcibly turning off the switch regardless of whether the switch control signal is outputted from the microcomputer when the system power supply IC detects an abnormal condition of the microcomputer; and
based on the switch opening signal, stopping, by means of the switch, supplying the voltage outputted from the power supply circuit to the motor driving circuit, wherein:
the system power supply IC outputs motor brake signal for applying a brake on the motor when detecting the abnormal condition of the microcomputer, and
the motor driving circuit applies a brake on the motor in response to the motor brake signal, wherein the system power supply IC detects the abnormal condition of the microcomputer by at least one of a termination of output of a watchdog pulse signal from the microcomputer, an output of a response that has a value different from an expected value from the microcomputer during a communication with the microcomputer, and an output of the error signal from the microcomputer, wherein:
the microcomputer restarts in response to the reset signal,
after the restart, the microcomputer reads, from the system power supply IC through a communication, an error status relating to the abnormal condition of the microcomputer detected by the system power supply IC,
the microcomputer determines which abnormal condition occurs based on the error status that is read, and the microcomputer performs a latch-stop operation when the abnormal condition that is determined relates to an inside of the control device, and wherein the system power supply IC outputs the reset signal to the microcomputer, and outputs the switch opening signal when detecting the abnormal condition of the microcomputer.

* * * * *